(12) United States Patent
Wang et al.

(10) Patent No.: US 8,396,300 B2
(45) Date of Patent: Mar. 12, 2013

(54) OBJECT-END POSITIONING METHOD AND SYSTEM

(75) Inventors: Ko-Shyang Wang, Kaohsiung (TW); Po-Lung Chen, Taipei (TW); Jia-Chang Li, Pingtung County (TW); Chien-Chun Kuo, Tainan County (TW)

(73) Assignee: Industrial Technology Research Institute, Hsinchu (TW)

( * ) Notice: Subject to any disclaimer, the term of this patent is extended or adjusted under 35 U.S.C. 154(b) by 707 days.

(21) Appl. No.: 12/463,508

(22) Filed: May 11, 2009

(65) Prior Publication Data

US 2010/0142831 A1    Jun. 10, 2010

(30) Foreign Application Priority Data

Dec. 8, 2008   (TW) ................................ 97147736 A

(51) Int. Cl.
  *G06K 9/62*   (2006.01)
  *G06K 9/48*   (2006.01)
(52) U.S. Cl. .................... 382/216; 382/199; 382/209
(58) Field of Classification Search .................... None
  See application file for complete search history.

(56) References Cited

U.S. PATENT DOCUMENTS

| 5,524,637 A * | 6/1996 | Erickson | ...................... 600/592 |
| 6,307,951 B1 | 10/2001 | Tanigawa et al. | |
| 6,308,565 B1 | 10/2001 | French et al. | |
| 7,372,994 B2 * | 5/2008 | Hagio | ........................... 382/199 |
| 7,440,615 B2 * | 10/2008 | Gong et al. | .................... 382/173 |
| 2004/0091153 A1 * | 5/2004 | Nakano et al. | ................. 382/228 |
| 2010/0014710 A1 * | 1/2010 | Chen et al. | ..................... 382/103 |

FOREIGN PATENT DOCUMENTS

| JP | 2000-082148 | 3/2000 |
| JP | 2003-346162 | 12/2003 |
| JP | 2004-283959 | 10/2004 |
| JP | 2005-339363 | 12/2005 |
| JP | 2007-134913 | 5/2007 |
| TW | 200820099 | 5/2008 |

OTHER PUBLICATIONS

Japanese language office action dated May 24, 2011.
English language translation of office action.
English language translation of JP 2000-082148 (published Mar. 21, 2000).

(Continued)

*Primary Examiner* — Claire X Wang
*Assistant Examiner* — Jhere Rowland
(74) *Attorney, Agent, or Firm* — McClure, Qualey & Rodack, LLP

(57) ABSTRACT

An object-end positioning method is provided for positioning lower ends of two limbs of an object. In the method, a foreground processing is performed on an original image to obtain a foreground image. A number of turning points are obtained according to the foreground image, wherein connection of the turning points forms a polygonal curve. Each turning point is classified to be a convex or concave point according to an included angle between lines connecting the turning point to two adjacent turning points. A number of selected convex points and selected concave points are selected. Two of the selected convex points are selected as two temporary ends. Connection of the two temporary ends and a selected concave point located between the two temporary ends forms a triangle. Two positioning ends for positioning the lower ends of the two limbs of the object are determined according to the two temporary ends.

20 Claims, 4 Drawing Sheets

OTHER PUBLICATIONS

English language translation of JP 2003-346162 (published Dec. 5, 2003).

English language translation of JP 2004-283959 (published Oct. 14, 2004).

English language translation of JP 2005-339363 (published Dec. 8, 2005).

English language translation of JP 2007-134913 (published May 31, 2007).

English abstract of TW200820099.

* cited by examiner

OBJECT-END POSITIONING METHOD AND SYSTEM

This application claims the benefit of Taiwan application Serial No. 97147736, filed Dec. 8, 2008, the subject matter of which is incorporated herein by reference.

BACKGROUND OF THE INVENTION

1. Field of the Invention

The invention relates in general to an object-end positioning method and system, and more particularly to an object-end positioning method and system for positioning lower ends of two limbs of an object.

2. Description of the Related Art

A human-machine interactive interface is an interface for humans interacting with a computer. Normally, the human-machine interface includes a keyboard, a mouse or a touch panel. Humans are called users for this interface. The users can achieve the purpose of controlling the computer or interacting with the computer through the human-machine interface.

The U.S. Pat. No. 5,524,637 recites a patent titled "interactive system for measuring physiological exertion". According to the disclosure of the patent, the user wears an accelerometer on two legs and stands on a pressure sensor to measure the pressure applied by the two legs and the moving acceleration of the two legs. The user can thus interact with the interactive system according to the pressure and moving acceleration of the two legs.

Further, in these years, research staffs use an image processing technology to increase the interactivity between the user and the computer. The U.S. Pat. No. 6,308,565 recites a system and method for tracking and assessing movement skills in multidimensional space. This patent discloses that an active or a passive marker is attached to two legs of the user and the movement of the marker is detected by an image processing method to determining coordinate positions and movement status of the two legs in space. In this way, the user can interact with the interactive system by the movement of his/her two legs.

Although a number of human-machine interfaces have been provided, in the above embodiments, the user has to wear a specific device or clothes (such as the above accelerometer and marker) in order to enable the human-machine interface to position lower ends of his/her two legs, thereby increasing inconvenience of the user and reducing the willing of the user to use the interface. Therefore, how to position lower ends of the user's two legs without cause inconvenience of the user is still a subject of the industrial endeavor.

SUMMARY OF THE INVENTION

The invention is directed to a method for positioning lower ends of two limbs of an object and system using the same. The two limbs of the object can be two legs or two fingers of a human body. By using the method, the user can position ends of the object without the requirement for wearing a specific device or clothes, and thus increasing the convenience for the users.

According to a first aspect of the present invention, an object-end positioning method is provided for positioning lower ends of two limbs of an object. The method comprises the following steps. First, obtain an original image corresponding to an image information of the object. Next, perform a foreground processing on the original image to obtain a foreground image corresponding to an outline of the object. Following that, obtain a plurality of turning points according to the foreground image, wherein connection of the turning points forms a polygonal curve substantially approximate to the outline of the object in the original image. Afterwards, determine each of the turning points to be a convex point or a concave point according to an included angle between two lines connecting the turning point to two adjacent turning points and selecting a plurality of selected convex points and a plurality of selected concave points along a predetermined direction. Then, select two of the selected convex points as two temporary ends, wherein connection of the two temporary ends and a selected concave point located between the two temporary ends forms a triangle corresponding to the two limbs of the object in the original image. Finally, determine two positioning ends for positioning the lower ends of the two limbs of the object according to the two temporary ends.

According to a second aspect of the present invention, an object-end positioning system is provided for positioning lower ends of two limbs of an object. The system comprises a capturing unit, a processing unit, a matching unit and a positioning unit. The capturing unit is for obtaining an original image corresponding to an image information of the object. The processing unit is for performing a foreground processing on the original image to obtain a foreground image corresponding to an outline of the object, wherein the processing unit obtains a plurality of turning points according to the foreground image, connection of the turning points forms a polygonal curve substantially approximate to the outline of the object in the original image, and the processing unit determines each of the turning points to be a convex point or a concave point according to an included angle between two lines connecting the turning point to two adjacent turning points and selects a plurality of selected convex points and a plurality of selected concave points along a predetermined direction. The matching unit is for selecting two of the selected convex points as two temporary ends, wherein connection of the two temporary ends and a selected concave point located between the two temporary ends forms a triangle corresponding to the two limbs of the object in the original image. The positioning unit is for determining two positioning ends for positioning the lower ends of the two limbs of the object according to the two temporary ends.

The invention will become apparent from the following detailed description of the preferred but non-limiting embodiments. The following description is made with reference to the accompanying drawings.

DETAILED DESCRIPTION OF THE INVENTION

Figure 1:
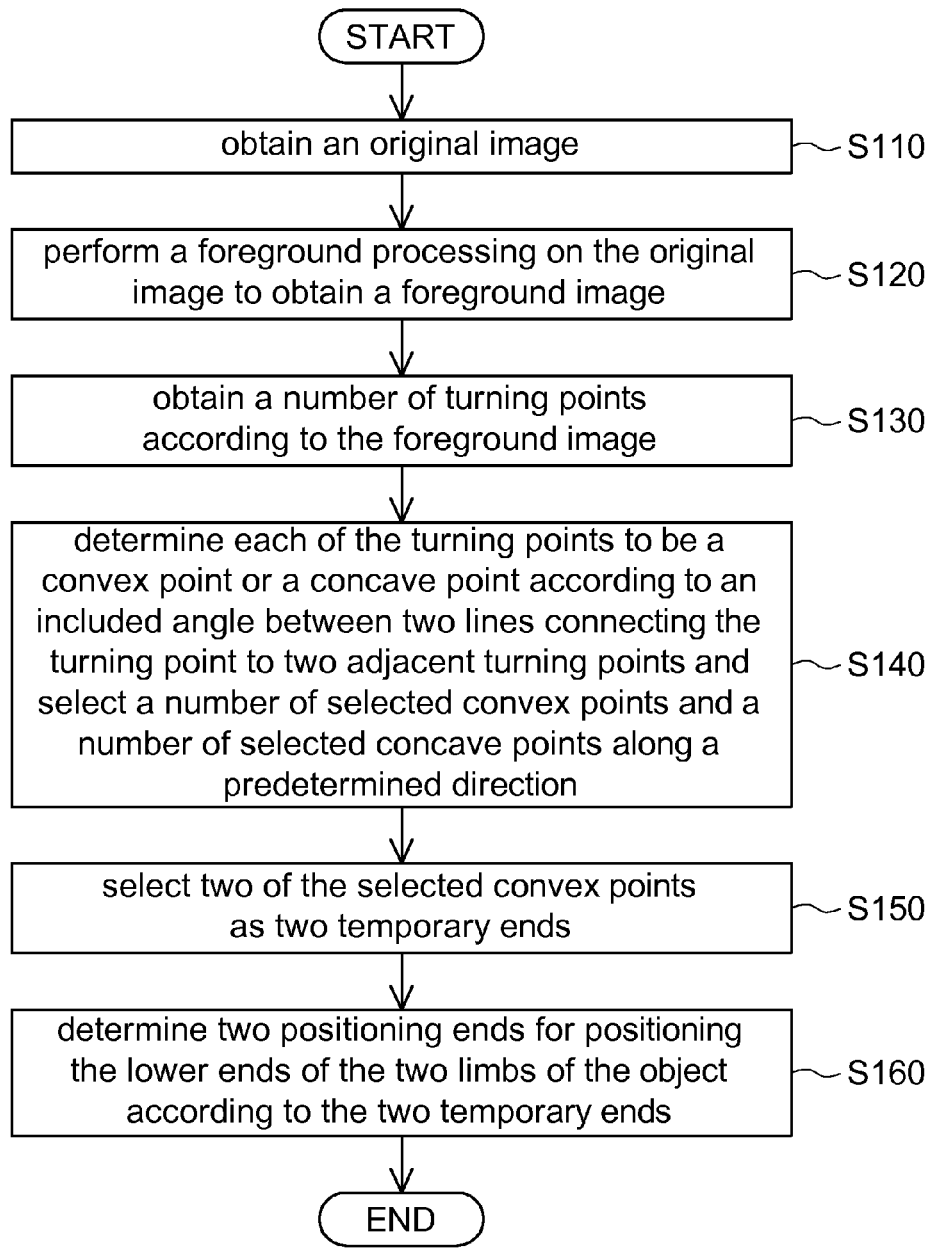
FIG. 1 is a flow chart of an object-end positioning method according to a preferred embodiment of the invention.

Referring to FIG. 1, a flow chart of an object-end positioning method according to a preferred embodiment of the invention is shown. The method is used for positioning lower ends of two limbs of an object. The method includes the followings steps.

First, in step S110, obtain an original image, which includes the image information corresponding to the object. Next, in step S120, perform a foreground processing on the original image to obtain a foreground image, wherein the foreground image corresponds to an outline of the object.

Following that, in step S130, obtain a number of turning points according to the foreground image. The connection of the turning points can form a polygonal curve substantially approximate to the outline of the object in the original image. Then, in step S140, determine each of the turning points to be a convex point or a concave point according to an included angle between two lines connecting the turning point to two adjacent turning points, and select a number of selected convex points and a number of selected concave points along a predetermined direction.

Afterwards, in step S150, select two of the selected convex points as two temporary ends. Connection of the selected two temporary ends and a selected concave point located between the two temporary ends forms a triangle corresponding to the two limbs of the object in the original image. Finally, in step S160, determine two positioning ends for positioning the lower ends of the two limbs of the object according to the two temporary ends.

Figure 2:
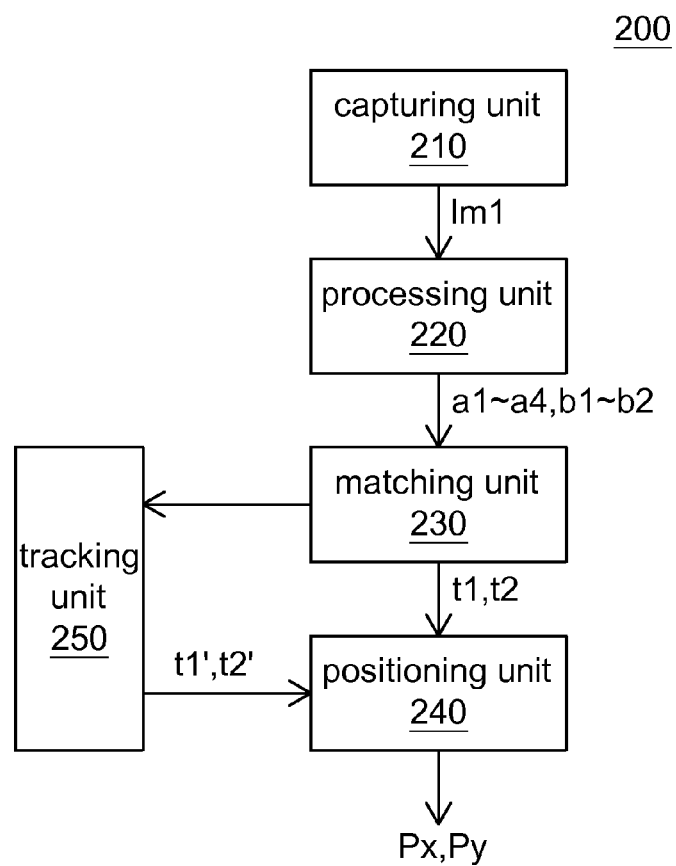
FIG. 2 shows a block diagram of an object-end positioning system using the method in FIG. 1.

In the following description, an object-end positioning system using the method in FIG. 1 will be illustrated as an example. FIG. 2 shows a block diagram of an object-end positioning system 200 using the method in FIG. 1. FIGS. 3-7 show an example of a number of images generated when the object-end positioning system 200 performs the object-end positioning method.

Figure 3:
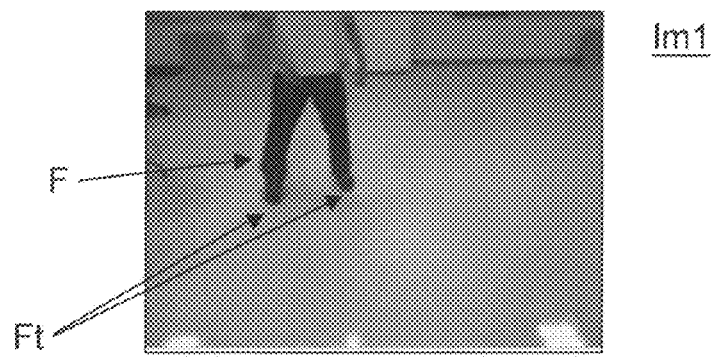
FIG. 3, FIG. 4, FIG. 5, FIG. 6, and FIG. 7 show an example of a number of images generated when the object-end positioning system performs the object-end positioning method.
Figure 4:
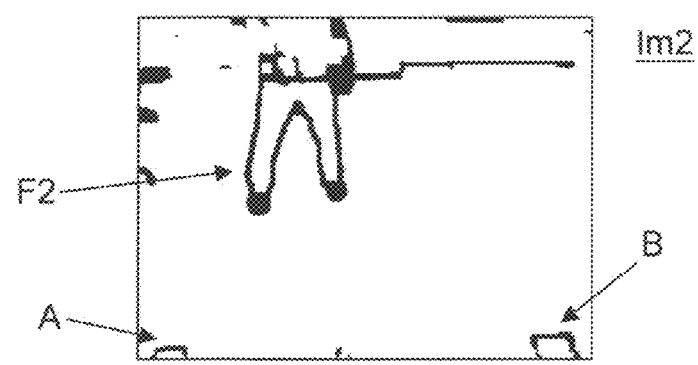

Referring to FIG. 2 and FIGS. 3-7 at the same time, the system 200 can position lower ends Ft of two legs F of a human body, as shown in FIG. 3. The object-end positioning system 200 includes a capturing unit 210, a processing unit 220, a matching unit 230, a positioning unit 240 and a tracking unit 250.

The capturing unit 210 is for obtaining an original image Im1. As shown in the FIG. 3, the original image Im1 includes an image information corresponding to the two legs F of a human body.

The processing unit 220 is for performing a foreground processing on the original image Im1 to obtain a foreground image. For example, when the processing unit 220 performs the foreground processing on the original image Im1, the processing unit 220 performs an edge-detection on the original image Im1. Accordingly, the processing unit obtains a foreground image Im2 including an edge-information of the original image Im1, wherein the foreground image Im2 has an outline F2 of the two legs, as shown in the FIG. 4.

When the foreground processing is performed on the original image Im1, the obtained foreground image Im2 usually includes outlines of objects in the scene, such as the outline F2 of the two legs and outlines A and B of other objects. Therefore, the processing unit 220 can filter the foreground image Im2 to leave the outline F2 of the two legs only. In practical applications, because the outline F2 of the two legs is usually a block having the largest area, the processing unit 220 can find out and reserve the outline F2 of the two legs by calculating block areas of the outlines F2, A and B.

Figure 5:
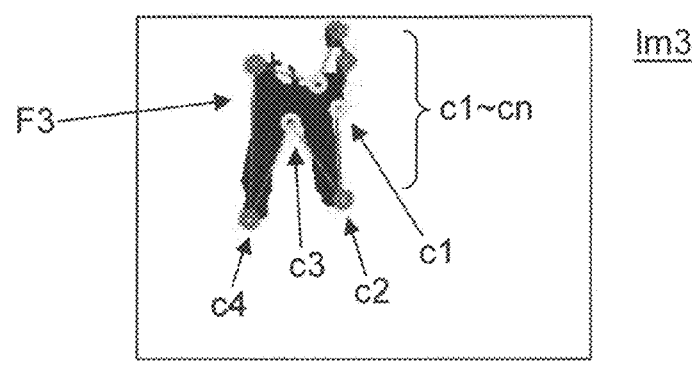

Afterwards, as shown in the FIG. 5, the processing unit 220 obtains a number of turning points c1 to cn according to the foreground image Im2. The connection of the turning points c1 to cn can form a polygonal curve F3, wherein the polygonal curve F3 has a shape substantially approximate to the outline F2 of the two legs.

Then, the processing unit 220 determines each of the turning points c1 to cn to be a convex point or a concave point according to an included angle between two lines connecting the turning point to two adjacent turning points.

The convex and concave points can, for example, and without being limited, be defined as followings. The turning point is defined as a convex point when the included angle between two lines connecting to the turning point to two adjacent turning points is in the range of 0 to 120 degrees, while the turning point is defined as a concave point when the included angle between two lines connecting to the turning point to two adjacent turning points is larger than 240 degrees. In the above definition, the included angle is an interior angle of a polygonal curve F3. Therefore, as shown in the FIG. 5, the included angle between two lines connecting the turning point c2 to the two adjacent turning points c1 and c3 defines the turning point c2 is a convex point, while the included angle between two lines connecting the turning point c3 to the two adjacent turning points c2 and c4 defines the turning point c3 is a concave point.

For example, after the convex points and the concave points are determined from the turning points c1 to cn, the processing unit 220 selects four selected convex points a1 to a4 and two selected concave points b1 and b2 along a predetermined direction. As shown in the FIG. 6, for example, the predetermined direction is a direction D1 oriented from the lower end to the upper end of the two legs.

Following that, the matching unit 230 selects two of the selected convex points a1 to a4 as two temporary ends t1 and t2, wherein the connection of the selected two temporary ends t1 and t2 and a selected concave point located between the two temporary ends t1 and t2 forms a triangle corresponding to the two legs F in the original image Im1. As shown in the FIG. 7, two selected convex points a1 and a2 together with a selected concave point located therebetween forms a triangle and the triangle substantially positions the two legs F of a human body.

To describe in details, when the matching unit 230 selects two of the selected convex points a1 to a4 as the two temporary ends t1 and t2, the matching unit judges if the selected convex points a1 to a4 and the selected concave points b1 and b2 meet a triangular-characteristic match.

When determining the triangular-characteristic match, the matching unit 230 judges if a slope of a connection line between two of the selected convex points a1 to a4 is smaller than a predetermined slope according to a vector perpendicular to the predetermined direction D1. The matching unit 230 further judges if the position of one of the selected concave points b1 and b2 projected to the vector is located between the positions of two of the selected convex points a1 to a4 projected to the vector.

Figure 7:
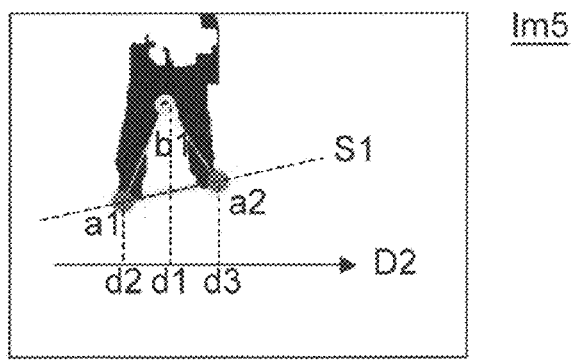

For example, in the FIG. 7, the above predetermined slope is 45°. The slope S1 of the connection line between the selected convex points a1 and a2 is smaller than the predetermined slope, and the position d1 of the selected concave point b1 projected to the vector D2 is located between the positions d2 and d3 of the selected convex points a1 and a2 projected to the vector D2. Thus, the matching unit 230 determines the selected convex points a1 and a2 and the selected concave point b1 meet the triangular-characteristic match.

Figure 6:
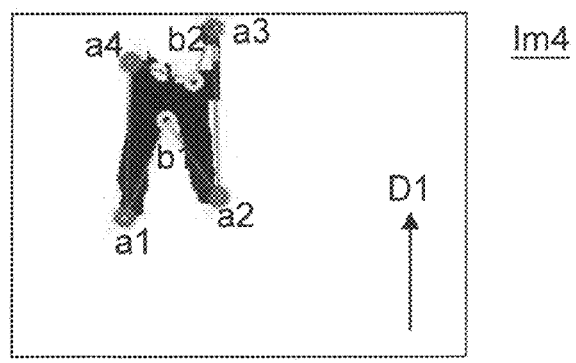

Moreover, as shown in the FIG. 6, if the side close to the lower ends Ft of the two legs F is defined to be a lower end, the predetermined direction D1 is a direction oriented from the lower side to an upper side. After the matching unit 230 determines the selected convex points a1 and a2 and the selected concave point b1 meet the triangular-characteristic match, the matching unit 230 further judges if the selected convex points a1 and a2 are closer to the lower side than the selected concave point b1. As shown in the FIG. 7, the matching unit 230 will determine the selected convex points a1 and a2 are closer to the lower side than the selected concave point b1.

When the matching unit 230 judges if the selected convex points a1 to a4 and the selected concave points b1 and b2 meet the triangular-characteristic match, if the matching unit 230 determines another two of the selected convex points and the corresponding one of the selected concave points also meet the triangular-characteristic match in addition to the selected convex points a1 and a2 and the selected concave point b1, the matching unit 230 further judges if the area formed by the selected convex points a1 and a2 and the selected concave point b1 is larger than the area formed by the another two of the selected convex points and the corresponding one of the selected concave points.

In the FIG. 7, it is supposed that the matching unit 230 determines the selected convex points a1 and a2 and the selected concave point b1 meet the triangular-characteristic match, determines the selected convex points a1 and a2 are closer to the lower side than the selected concave point b1, and further determines the area formed by the selected convex points a1 and a2 and the selected concave point b1 is the largest. Therefore, the matching unit 230 determines to select the two selected convex points a1 and a2 to be the two temporary ends t1 and t2.

Referring to FIG. 2, after the matching unit 230 selects the selected convex points a1 and a2 to be the two temporary ends t1 and t2, the positioning unit 240 is used to determine two positioning ends Px and Py according to the two temporary ends t1 and t2. From the FIG. 7, it can be known that the positions of the selected convex points a1 and a2 determined by the matching unit 230 is substantially those of the lower ends Ft of the two legs F. Therefore, the two positioning ends Px and Py determined by the positioning unit 240 can position the lower ends Ft of the two legs F of the human body.

In the above description, the object-end positioning system 200 positions lower ends of two legs of a human body by way of image processing and image-information judgment. Compared with the prior-art positioning system requiring the user to wear a specific device or clothes to position the two legs of the user, the object-end positioning system 200 does not require the user to wear any specific device or clothes, thereby increasing the usage convenience of the user and avoiding the issue of reducing the user's willing to use the system.

Furthermore, when the matching unit 230 determines the selected convex points a1 to a4 and the selected concave points b1 and b2 do not meet the triangular-characteristic match, the matching unit 230 will enable the tracking unit 250. The enabled tracking unit 250 obtains two tracking ends t1' and t2' according to two previous ends. The two previous ends are the lower ends of the two limbs of the object positioned from a previous original image by the positioning unit 240.

To describe in more details, the tracking unit 250 can track the lower ends of the two legs positioned from a previous original image to generate the two tracking ends t1' and t2' close to the two real positioning ends. Therefore, even the positioning unit 240 fails in correctly determining the two positioning ends Px and Py through the matching unit 230, the positioning unit 240 can also determine two positioning ends Px and Py close to the real two positioning ends, thereby increasing the operation stability of the object-end positioning system 200.

When the capturing 210 sequentially obtains a number of original images, because the movement of the object (e.g. the two legs F of a human body) has a specific range, the variation of the lower ends of the two limbs (e.g. variation of the lower ends Ft of the two legs F) positioned by the positioning unit 240 will also fall in a specific range. Therefore, if the matching unit 240 fails in positioning the lower ends Ft of the two legs F of a human body from a certain original image, the tracking unit 250 can be used to track the lower ends Ft of the two legs F positioned from the previous original image, so as to find out two tracking ends t1' and t2' close to the two real positioning ends. A number of examples will be given to illustrate how the tracking unit 250 obtains the two tracking ends t1' and t2' in the following description.

In the first example, when the tracking unit 250 is to obtain the two tracking ends t1' and t2', the tracking unit 250 determines the two tracking ends t1' and t2' according to a brightness variation of surrounding pixels of the two previous ends in the previous original image and the original image Im.

In the second example, when the tracking unit 250 is to obtain the two tracking ends t1' and t2', the tracking unit 250 determines the two tracking ends t1' and t2' according to a color variation of surrounding pixels of the two previous ends in the previous original image and the original image Im.

In the third example, when the tracking unit 250 is to obtain the two tracking ends t1' and t2', the tracking unit 250 determines the two tracking ends t1' and t2' by a prediction or probability method according to positions of the two previous ends and another two previous ends. The another two previous ends are lower ends of the two limbs of the object positioned from another one previous original image, and the original image Im, the previous original image and the another one previous original image are continuously obtained.

In the above first and second examples, the two tracking ends t1' and t2' are respectively determined according to brightness and color variation of the original image Im and the previous original image. In the third example, the two tracking ends t1' and t2' are determined by a prediction or probability method. These examples are used for the sake of elaborating the invention but the invention is not limited thereto. As long as the tracking unit 250 is used to generate two tracking ends t1' and t2' close to the two real positioning ends when the matching unit 230 determines the selected convex points a1 to a4 and the selected concave points b1 and b2 do not meet the triangular-characteristic match, such an alternative is not apart from the scope of the invention.

The object-end positioning system 200 of the invention can determine two positioning ends Px and Py for positioning the lower ends Ft of the two legs F of a human body after obtaining an original image. Further, if the object-end positioning system 200 can sequentially obtain a number of original images in a period of time, then it can sequentially position the lower ends of the two legs of a human body in these original images. Therefore, the object-end positioning system 200 can have a further analysis on the position information to determine a moving direction, a moving velocity or a movement status of the two legs F in this period of time.

Besides, in the above description, the object-end positioning system 200 is exemplified to position the lower ends Ft of the two legs F of a human body, the invention is not limited thereto. The object-end positioning system 200 can also position lower ends of two fingers of a human body. In this case, the above predetermined direction is referred to a direction oriented form a lower end to an upper end of the fingers of human's hand. That is, the object-end positioning system 200 selects the selected convex points and the selected concave points along the direction which oriented form the lower end to the upper end of the fingers. Therefore, the object-end positioning system 200 can also two selected convex points as two temporary ends and the connection of the two temporary ends and a selected concave point located therebetween forms a triangle corresponding to the two fingers.

The object-end positioning method and system disclosed by the above embodiment of the invention can position lower ends of two limbs of an object. The two limbs of the object can be two legs or two fingers of a human body. Through the object-end positioning method and system, the event which requires the user to wear the specific device or clothes can be avoided, thereby increasing the usage convenience of the user and preventing the issue of reducing the user's willing to use the system.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An object-end positioning method, for positioning lower ends of two limbs of an object, the method comprising:
   obtaining an original image corresponding to an image information of the object;
   performing a foreground processing on the original image to obtain a foreground image corresponding to a contour of the object;
   obtaining a plurality of turning points according to the foreground image, wherein the turning points are positioned along the contour and connection of the turning points with straight line segments forms a single polygonal curve substantially approximate to the contour of the object in the original image;
   determining each of the turning points to be a convex point or a concave point, and selecting a plurality of selected convex points and a plurality of selected concave points along a predetermined direction, wherein the convex point and two straight line segments adjacent to the convex point form an interior angle of the single polygonal curve less than 180 degrees, and the concave point and two straight line segments adjacent to the concave point form an interior angle of the single polygonal curve larger than 180 degrees;
   selecting two of the selected convex points as two determined ends, wherein connection of the two determined ends and a selected concave point located between the two determined ends forms a triangle corresponding to the two limbs of the object in the original image; and
   determining two positioning ends for positioning the lower ends of the two limbs of the object according to the two determined ends;
   wherein the two determined ends indicate the lower ends of the two limbs of the object, respectively.

2. The method according to claim 1, wherein the predetermined direction is related to a direction oriented from the lower end to the upper end in each of the two limbs of the object in the original image.

3. The method according to claim 1, wherein before the step of selecting two of the selected convex points as the two determined ends, the method further comprises:
   judging if the selected convex points and the selected concave points meet a triangular-characteristic match; and
   if the two of the selected convex points and one of the selected concave points meet the triangular-characteristic match, determining the two of the selected convex points as the two determined ends.

4. The method according to claim 3, wherein the step of determining the two of the selected convex points as the two determined ends further comprises:
   if the two of the selected convex points and one of the selected concave points meet the triangular-characteristic match, and another two of the selected convex points and another one of the selected concave points also meet the triangular-characteristic match, judging if an area formed by the two of the selected convex points and the one of the selected concave points is larger than an area formed by the another two of the selected convex points and the another one of the selected concave points, and if yes, determining the two of the selected convex points as the two determined ends.

5. The method according to claim 3, wherein the step of determining if the selected convex points and the selected concave points meet the triangular-characteristic match comprises:
   judging if a slope of a connection line between the two of the selected convex points is smaller than a predetermined slope according to a vector perpendicular to the predetermined direction, and judging if a position of the one of the selected concave points projected to the vector is located between positions of the two of the selected convex points projected to the vector.

6. The method according to claim 3, wherein if a side close to the lower ends of the two limbs of the object is defined to be a lower side, the predetermined direction is a direction from the lower side to an upper side, and the step of determining the two of the selected convex points as the two determined ends comprises:
   judging if the two of the selected convex points is closer to the lower side than the one of the selected concave point, and if yes, determining the two of the selected convex points as the two determined ends.

7. The method according to claim 3, wherein after the step of judging if the selected convex points and the selected concave points meet the triangular-characteristic match, the method further comprises:
   if the selected convex points and the selected concave points do not meet the triangular-characteristic match, obtaining two tracking ends according to two previous ends, wherein the two previous ends are lower ends of the two limbs of the object positioned from a previous original image;
   wherein the step of determining the two positioning ends further comprises determining the two positioning ends according to the two tracking ends.

8. The method according to claim 7, wherein the step of obtaining the two tracking ends further comprises:
   determining the two tracking ends according to a brightness variation of surrounding pixels of the two previous ends in the previous original image and the original image.

9. The method according to claim 7, wherein the step of obtaining the two tracking ends further comprises:
   determining the two tracking ends according to a color variation of surrounding pixels of the two previous ends in the previous original image and the original image.

10. The method according to claim 7, wherein the step of obtaining the two tracking ends further comprises:
    determining the two tracking ends by a prediction or probability method according to positions of the two previous ends and another two previous ends;
    wherein the another two previous ends are lower ends of the two limbs of the object positioned from another one previous original image, and the original image, the previous original image and the another one previous original image are continuously obtained.

11. An object-end positioning system for positioning lower ends of two limbs of an object, the system comprising:
- a capturing circuit, for obtaining an original image corresponding to an image information of the object;
- a processor, for performing a foreground processing on the original image to obtain a foreground image corresponding to a contour of the object, wherein the processor obtains a plurality of turning points according to the foreground image, wherein the turning points are positioned along the contour and connection of the turning points with straight line segments forms a single polygonal curve substantially approximate to the contour of the object in the original image, and the processor determines each of the turning points to be a convex point or a concave point and selects a plurality of selected convex points and a plurality of selected concave points along a predetermined direction, wherein the convex point and two straight line segments adjacent to the convex point form an interior angle of the single polygonal curve less than 180 degrees, and the concave point and two straight line segments adjacent to the concave point form an interior angle of the single polygonal curve larger than 180 degrees;
- a matching circuit, for selecting two of the selected convex points as two determined ends, wherein connection of the two determined ends and a selected concave point located between the two determined ends forms a triangle corresponding to the two limbs of the object in the original image; and
- a positioning circuit, for determining two positioning ends for positioning the lower ends of the two limbs of the object according to the two determined ends;
- wherein the two determined ends indicate the lower ends of the two limbs of the object, respectively.

12. The system according to claim 11, wherein the predetermined direction is related to a direction oriented from the lower end to the upper end in each of the two limbs of the object in the original image.

13. The system according to claim 11, wherein when the matching circuit selects the two of the selected convex points as the two determined ends, the matching circuit judges if the selected convex points and the selected concave points meet a triangular-characteristic match, and if the matching circuit determines that the two of the selected convex points and one of the selected concave points meet the triangular-characteristic match, the matching circuit determines to select the two of the selected convex points as the two determined ends.

14. The system according to claim 13, wherein if the matching circuit determines that the two of the selected convex points and the one of the concave points meet the triangular-characteristic match and another two of the selected convex points and another one of the selected concave points also meet the triangular-characteristic match, the matching circuit further judges if an area formed by the two of the selected convex points and the one of the selected concave point is larger than an area formed by the another two of the selected convex points and the another one of the selected concave points, and if yes, the matching circuit determines the two of the selected convex points as the two determined ends.

15. The system according to claim 13, wherein when the matching circuit judges if the selected convex points and the selected concave points meet the triangular-characteristic match, the matching circuit judges if a slope of a connection line between the two of the selected convex points is smaller than a predetermined slope according to a vector perpendicular to the predetermined direction, and judges if a position of the one of the selected concave points projected to the vector is located between two positions of the two of the selected convex points projected to the vector.

16. The system according to claim 13, wherein if a side close to the lower ends of the two limbs of the object is defined to be a lower side, the predetermined direction is a direction from the lower side to an upper side, and the two of the selected convex points are closer to the lower side than the one of the selected concave points.

17. The system according to claim 13, wherein the matching circuit further comprises:
- a tracking circuit, for obtaining two tracking ends according to two previous ends, wherein the two previous ends are lower ends of the two limbs of the object positioned from a previous original image;
- wherein when the selected convex points and the selected concave points do not meet the triangular-characteristic match, the positioning circuit determines the two positioning ends according to the two tracking ends.

18. The system according to claim 17, wherein when the tracking circuit obtains the two tracking ends, the tracking circuit determines the two tracking ends according to a brightness variation of surrounding pixels of the two previous ends in the previous original image and the original image.

19. The system according to claim 17, wherein when the tracking circuit obtains the two tracking ends, the tracking circuit determines the two tracking ends according to a color variation of surrounding pixels of the two previous ends in the previous original image and the original image.

20. The system according to claim 17, wherein when the tracking circuit obtains the two tracking ends, the tracking circuit determines the two tracking ends by a prediction or probability method according to positions of the two previous ends and another two previous ends;
- wherein the another two previous ends are lower ends of the two limbs of the object positioned from another one previous original image by the positioning circuit, and the original image, the previous original image and the another one previous original image are continuously obtained by the capturing circuit.

* * * * *